(12) United States Patent
Ferguson et al.

(10) Patent No.: US 10,198,643 B1
(45) Date of Patent: *Feb. 5, 2019

(54) PLANE ESTIMATION FOR CONTEXTUAL AWARENESS

(71) Applicant: Waymo LLC, Mountain View, CA (US)

(72) Inventors: David I. Ferguson, San Francisco, CA (US); David Harrison Silver, Millbrae, CA (US); Hyman Jack Murveit, Portola Valley, CA (US)

(73) Assignee: Waymo LLC, Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/383,317

(22) Filed: Dec. 19, 2016

Related U.S. Application Data

(63) Continuation of application No. 14/503,626, filed on Oct. 1, 2014, now Pat. No. 9,558,411.

(60) Provisional application No. 62/043,581, filed on Aug. 29, 2014.

(51) Int. Cl.
*G06K 9/00* (2006.01)
*G06K 9/62* (2006.01)
*G05D 1/02* (2006.01)

(52) U.S. Cl.
CPC ....... *G06K 9/00818* (2013.01); *G05D 1/0246* (2013.01); *G06K 9/6202* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 7,623,248 B2 | 11/2009 | Laflamme | |
| 8,559,673 B2 | 10/2013 | Fairfield et al. | |
| 2005/0134440 A1 | 6/2005 | Breed | |
| 2005/0192736 A1* | 9/2005 | Sawada | G09B 9/05 701/117 |
| 2012/0083960 A1* | 4/2012 | Zhu | G05D 1/0214 701/23 |
| 2012/0320204 A1 | 12/2012 | Dahlin | |

(Continued)

FOREIGN PATENT DOCUMENTS

EP  2026313 A1  2/2009

OTHER PUBLICATIONS

Wikipedia, the free encyclopedia, "RANSAC", downloaded on Aug. 14, 2014, <http://en.wikipedia.org/wiki/RANSAC>.

*Primary Examiner* — Vu Le
*Assistant Examiner* — Guillermo M Rivera-Martinez
(74) *Attorney, Agent, or Firm* — Lerner, David, Littenberg, Krumholz & Mentlik, LLP

(57) ABSTRACT

Aspects of the disclosure relate to classifying the status of objects. For examples, one or more computing devices detect an object from an image of a vehicle's environment. The object is associated with a location. The one or more computing devices receive data corresponding to the surfaces of objects in the vehicle's environment and identifying data within a region around the location of the object. The one or more computing devices also determine whether the data within the region corresponds to a planar surface extending away from an edge of the object. Based on this determination, the one or more computing devices classify the status of the object.

20 Claims, 10 Drawing Sheets

(56) References Cited

U.S. PATENT DOCUMENTS

| | | | |
|---|---|---|---|
| 2013/0033603 A1* | 2/2013 | Suzuki | G08G 1/04 |
| | | | 348/148 |
| 2013/0101157 A1 | 4/2013 | Li et al. | |
| 2014/0063232 A1 | 3/2014 | Fairfield et al. | |
| 2014/0119605 A1 | 5/2014 | Zobel | |

* cited by examiner

PLANE ESTIMATION FOR CONTEXTUAL AWARENESS

CROSS-REFERENCE TO RELATED APPLICATIONS

The present application is a continuation of U.S. patent application Ser. No. 14/503,626, filed Oct. 1, 2014, which claims the benefit of the filing date of U.S. Provisional Patent Application No. 62/043,581 filed Aug. 29, 2014, the disclosures of which are hereby incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, signs, and other objects. In this regard, the information from the perception system and detailed map information may be used to assist a vehicle's computer in making driving decisions involving intersections and traffic signals.

BRIEF SUMMARY

One aspect of the disclosure provides a computer-implemented method. The method includes detecting, by one or more computing devices, an object from an image of a vehicle's environment. The object is associated with a location. The method also includes receiving, by the one or more computing devices, data corresponding to the surfaces of objects in the vehicle's environment; identifying, by the one or more computing devices, data within a region around the location of the object based on the received data; determining, by the one or more computing devices, whether the data within the region corresponds to a planar surface extending away from an edge of the object; and based on the determination, classifying, by the one or more computing devices, the status of the object.

In one example, the method also includes before projecting, determining that the object is a temporary object by comparing the location to detailed map information for the vehicle's environment. In another example, the method also includes identifying the object as a stop sign, and when the status of the object is classified as inactive, maneuvering the vehicle without reacting to the object as a stop sign. In another example, the method also includes identifying the object as a stop sign, and when the status of the object is classified as active, maneuvering the vehicle by obeying the stop sign. In another example, the classifying is further based on a distance between the planar surface to a surface of the object. In another example, the classifying is further based on a distance that the planar surface extends away from the edge of the object. In another example, the method also includes maneuvering the vehicle based on the classification of status of the object.

Another aspect of the disclosure provides a system comprising one or more computing devices. The one or more computing devices are configured to detect an object from an image of a vehicle's environment. The object is associated with a location. The one or more computing devices are also configured to receive data corresponding to the surfaces of objects in the vehicle's environment, identify data within a region around the location of the object based on the received data, determine whether the data within the region corresponds to a planar surface extending away from an edge of the object, and based on the determination, classify the status of the object.

In one example, the one or more computing devices are also configured to before projecting, determine that the object is a temporary object by comparing the location to detailed map information for the vehicle's environment. In another example, the one or more computing devices are also configured to identify the object as a stop sign, and when the status of the object is classified as inactive, maneuver the vehicle without reacting to the object as a stop sign. In another example, the one or more computing devices are also configured to identify the object as a stop sign, and when the status of the object is classified as active, maneuver the vehicle by obeying the stop sign. In another example, the one or more computing devices are also configured to classify the status of the object further based on a distance between the planar surface to a surface of the object. In another example, the one or more computing devices are also configured to classify the status of the object further based on a distance that the planar surface extends away from the edge of the object. In another example, the system also includes the vehicle and the one or more computing devices are further configured to maneuver the vehicle based on the classification of status of the object.

A further aspect of the disclosure provides a non-transitory, tangible computer readable medium on which instructions are stored. The instructions, when executed by one or more processors cause the one or more processors to perform a method. The method includes detecting an object from an image of a vehicle's environment. The object is associated with a location. The method also includes receiving data corresponding to the surfaces of objects in the vehicle's environment based on the received data; identifying data within a region around the location of the object; determining whether the data within the region corresponds to a planar surface extending away from an edge of the object; and based on the determination, classifying the status of the object.

In one example, the method also includes before projecting, determining that the object is a temporary object by comparing the location to detailed map information for the vehicle's environment. In another example, the method also includes identifying the object as a stop sign, and when the status of the object is classified as inactive, maneuvering the vehicle without reacting to the object as a stop sign. In another example, the method also includes identifying the object as a stop sign, and when the status of the object is classified as active, maneuvering the vehicle by obeying the stop sign. In another example, the classifying is further based on a distance between the planar surface to a surface of the object. In another example, the classifying is further based on a distance that the planar surface extends away from the edge of the object. In another example, the method also includes maneuvering the vehicle based on the classification of status of the object.

DETAILED DESCRIPTION

Overview

Figure 1:
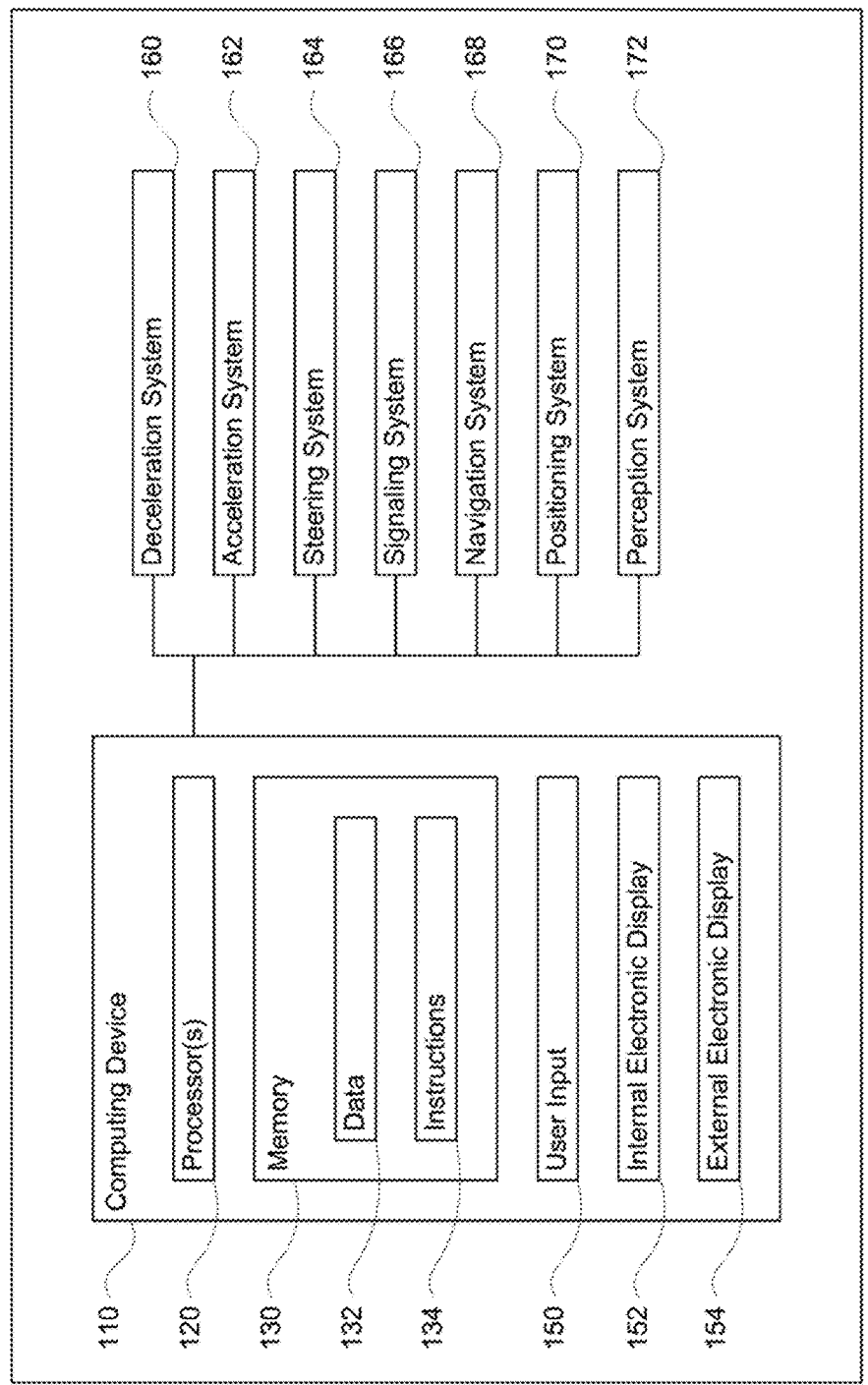
FIG. 1 is a functional diagram of a system in accordance with aspects of the disclosure.

The technology relates to determining whether an autonomous vehicle should react to or ignore an object identified in a camera image. For example, understanding context of an object such as when a stop sign is active (such as when it is being held by a construction worker) or when a stop sign is inactive (a reflection on a specular object or a stop sign on a side of a school bus that is not in use) is a challenging task for a robotic system. However, understanding such contexts is key to maneuvering an autonomous vehicle safely in an ever-changing world.

In many cases, whether objects are detected proximate to a planar surface is a highly consistent indicator of the context of such objects. Using the stop sign example, active temporary stop signs are almost always held by a person, perpendicular to a side of a school bus or other vehicle, or affixed to a small stand sitting on the road. Permanent or inactive stop signs may be attached to fences or walls or affixed generally parallel to the side of a school bus or other vehicle. In addition, false positive temporary stop signs may also be located on flat surfaces (such as a billboard) or a specular surface reflecting a stop sign image. Thus, the autonomous vehicle may assume that if a detected stop sign is on a large planar surface then it is very unlikely it is an active temporary stop sign.

Before determining their status, objects may first be detected from images captured by cameras of the autonomous vehicle. In this regard, image processing techniques may be used to identify an object, such as a stop sign. As an example, templates of different dimensions corresponding to the shape of a stop sign may be used to identify potential stop signs using a sliding window approach. False positives may be eliminated by further processing such as by comparing the location in other camera images, using OCR to detect text of the stop sign, color and feature recognition, etc. Using this information, a classifier may process the detected features, colors, edges, etc. to estimate whether to treat a potential stop sign as a stop sign.

Once a stop sign is detected, the autonomous vehicle may determine whether the stop sign is a permanent one or a temporary one. This may be done by comparing the approximate location of the stop sign as determined from the camera image to detailed map information which specifies the locations of where stop signs are expected to be detected.

As noted above, for the temporary stop signs, the autonomous vehicle must determine whether there is a plane extending away from or adjacent to the surface of the stop sign. In order to do so, the autonomous vehicle may also receive information from a laser detection system which provides laser data points identifying the intensity and location of surfaces of objects in the vehicle's environment. The laser data points may be projected onto a three dimensional box that is larger than the shape of the stop sign. The data points within the box may then be processed to determine whether the points correspond to a plane. Given the examples above, the autonomous vehicle may expect a plane of an inactive sign to extend away from one or more of the bottom, top, left, or right of the stop sign for at least some distance.

Whether or not a plane is detected may be used to classify the status of the object. For example, the closer the plane is to the surface of the stop sign and the greater the distance a plane extends away from or adjacent to the stop sign, the more likely, or higher confidence the autonomous vehicle will have that the stop sign is inactive or a false positive (such as a reflection of another stop sign). In that regard, if no plane is detected proximate to the surface of the stop sign, the autonomous vehicle may identify the stop sign as an active stop sign.

Depending on whether the autonomous vehicle classifies the object as active, inactive, or a false positive, the autonomous vehicle may ignore or respond to the object. As an example, in the case of a stop sign, this may prevent dangerous situations such as stopping adjacent to a school bus when the school bus's stop sign is not active or not stopping for a stop sign held by a construction worker.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
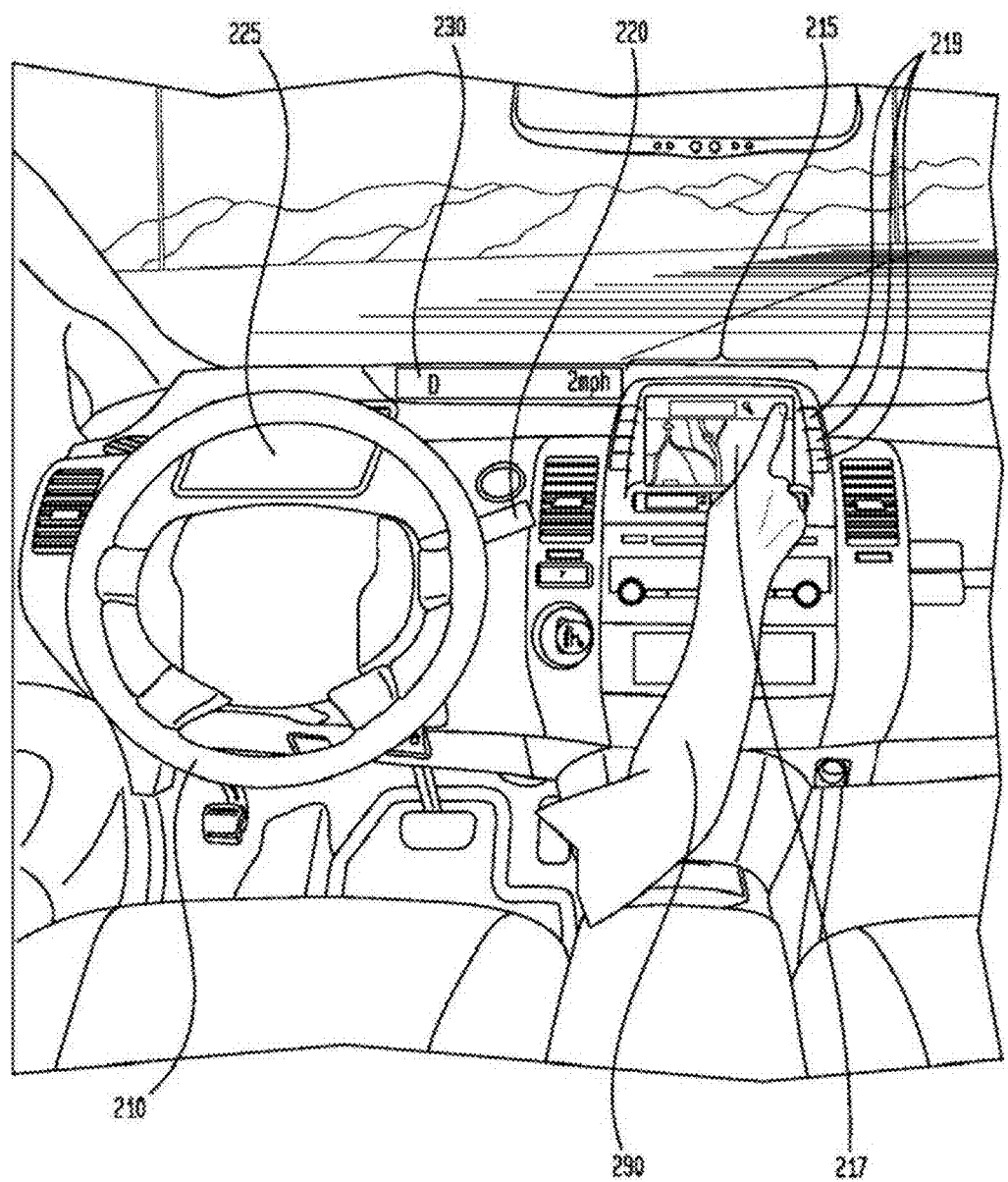
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shapes, geographic location coordinates, and elevations of various objects that were previously observed such as roadways, features used to define driving lanes, intersections, crosswalks, traffic signals, buildings, signs, vegetation, signs (such as stop signs, street signs, speed limit signs, etc.), or other such objects and information that the vehicle's computers may use to control the vehicle safely.

Figure 3:
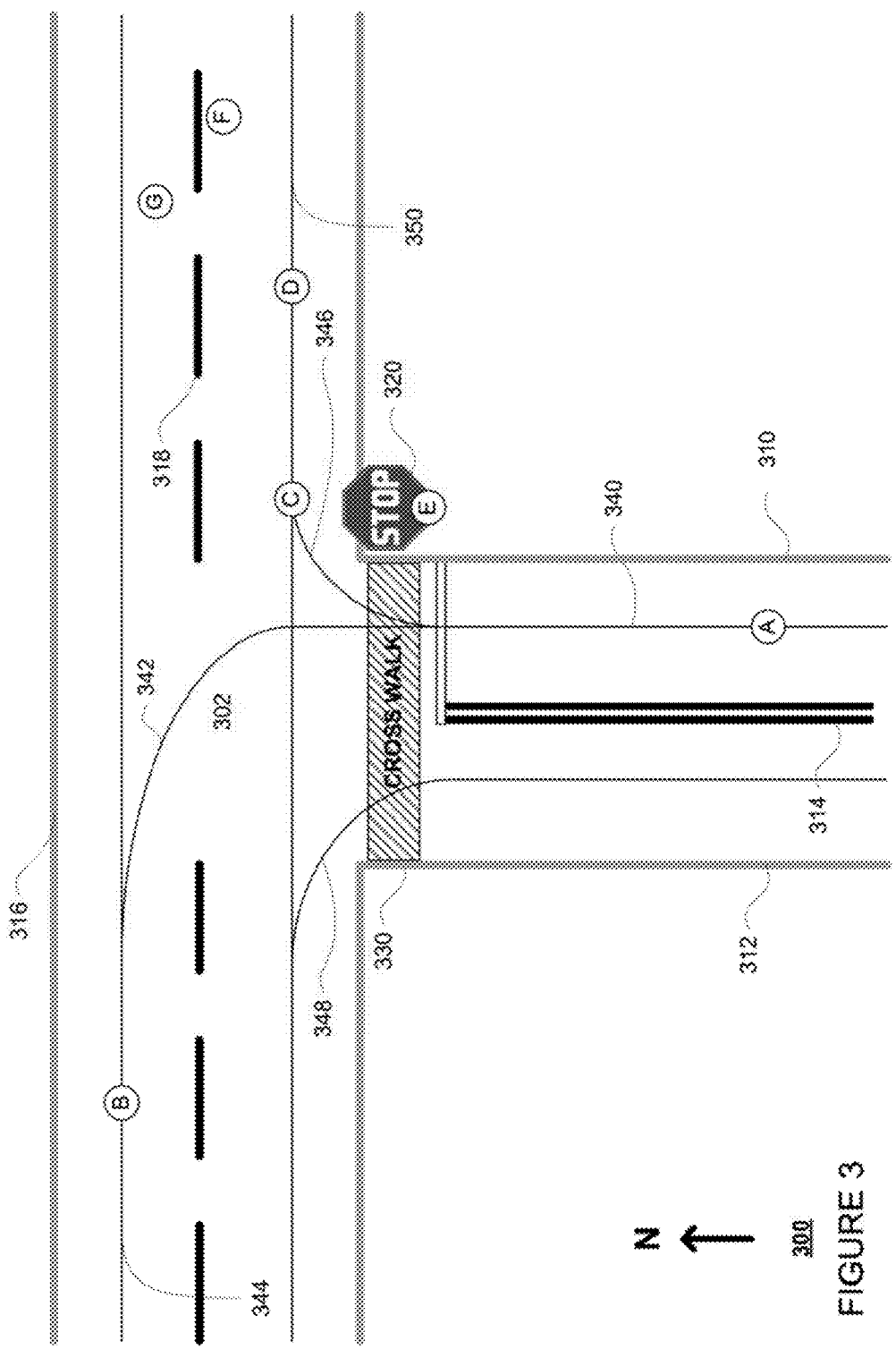
FIG. 3 is an example of map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, 316 and 318, stop sign 320, as well as crosswalk 330.

In addition, the detailed map information includes a network of rails 340, 342, 344, 346, 348, and 350 which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 340, transitioning to rail 342, and subsequently transitioning to rail 344 in order to make a left turn at intersection 302.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers.

The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 4:
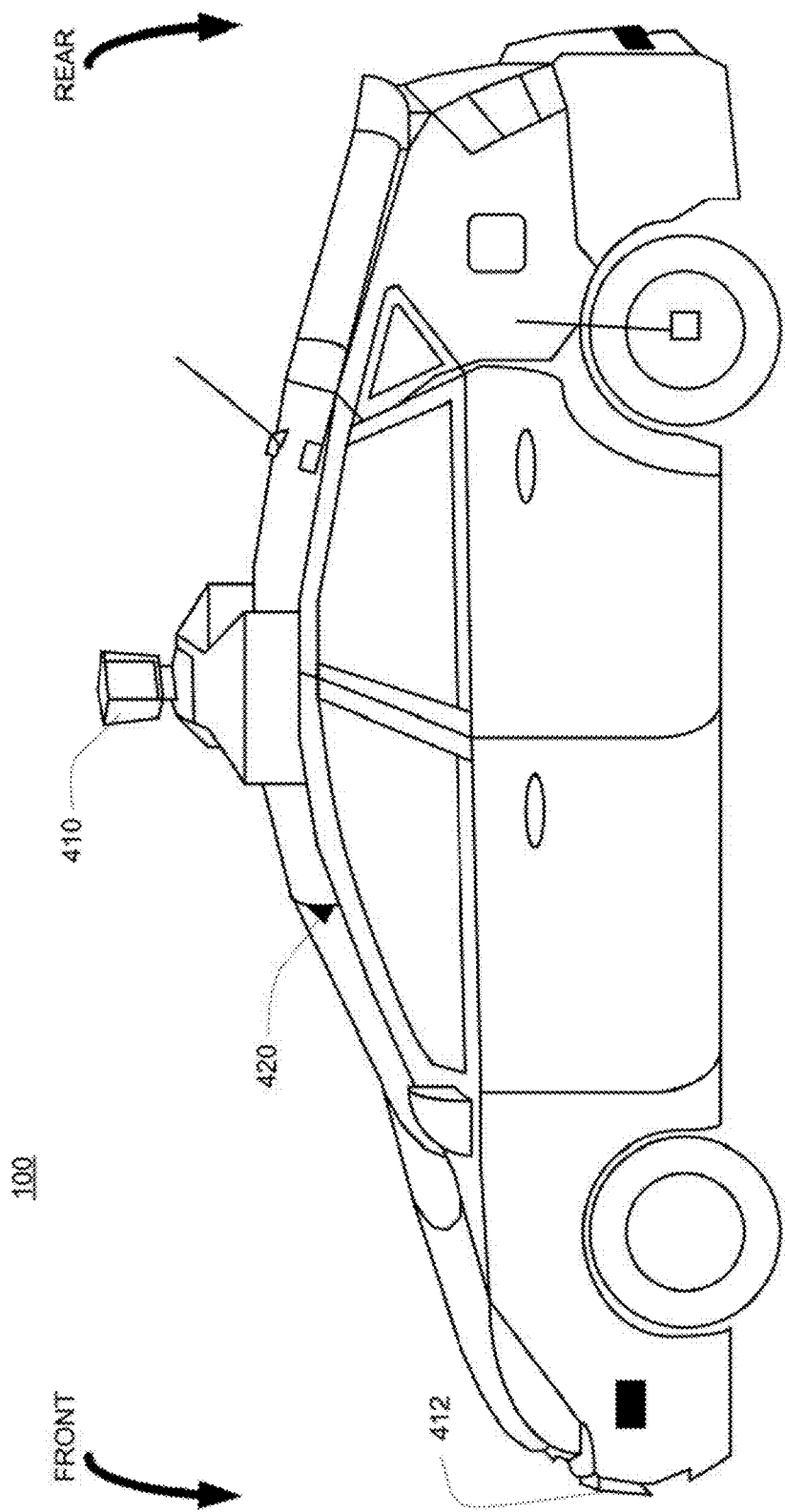
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 410 and 412 may be positioned or mounted on the vehicle. As an example, the one or more computing devices 110 (not shown) may control laser range finder 410, e.g., by rotating it 180 degrees. In addition, the perception system may include one or more cameras 420 mounted internally on the windshield of vehicle 100 to receive and analyze various images about the environment. In addition to the laser range finder 410 is positioned on top of perception system 172 in FIG. 4, and the one or more cameras 420 mounted internally on the windshield, other detection devices, such as sonar, radar, GPS, etc., may also be positioned in a similar manner.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, a vehicle's one or more computing devices may maneuver the vehicle using the various systems described above. While doing so, the perception system 172 may capture various images of various objects in the vehicle's environment using one or more cameras.

Figure 5:
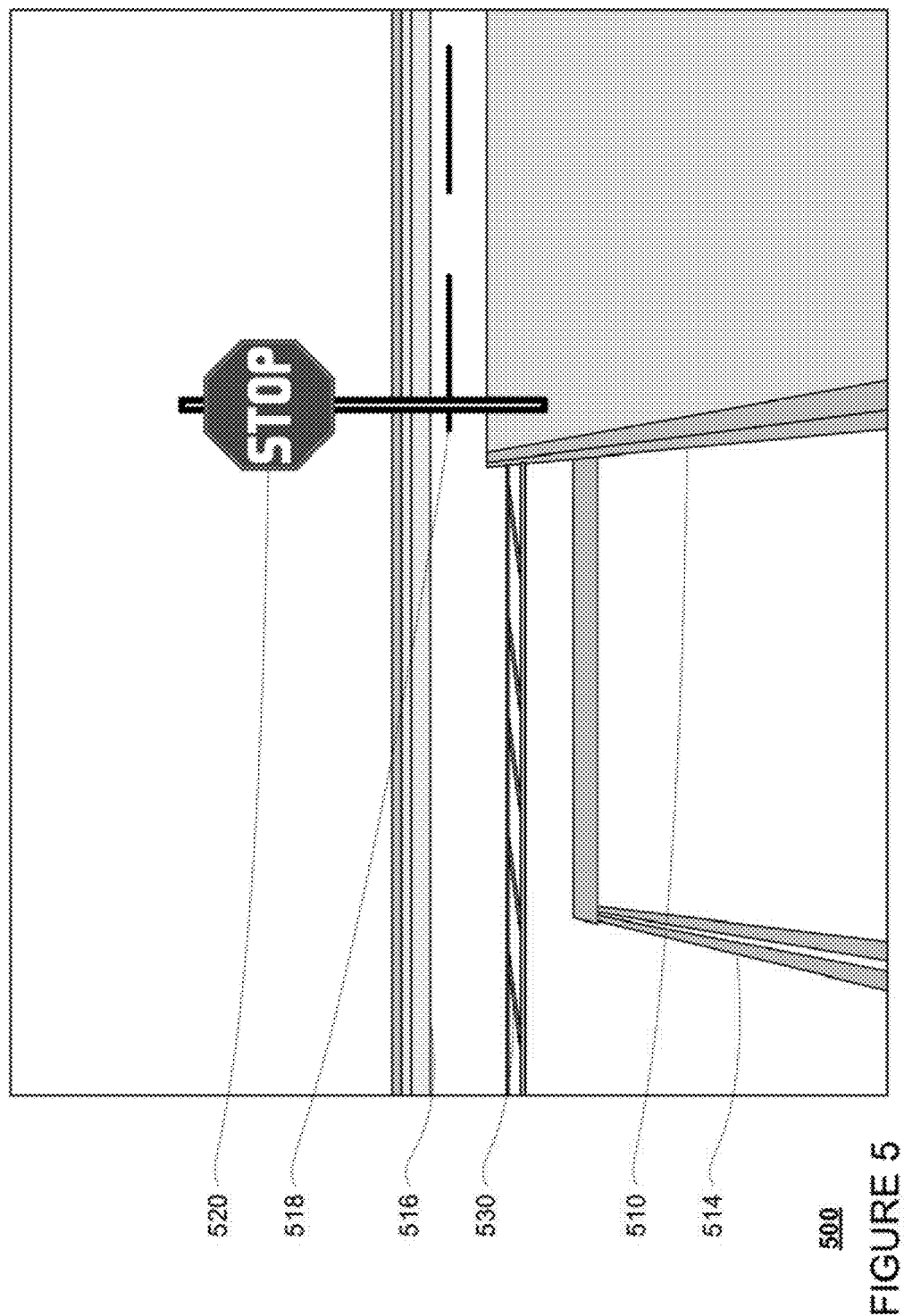
FIG. 5 is an example image of the vehicle's environment in accordance with aspects of the disclosure.

For example, FIG. 5 is an example of an image 500 of various objects in the vehicle's environment captured by a camera such as camera 420. In this example, the camera 420 may be located at point A of FIG. 3 oriented in a generally north direction. In that regard, at least some of the various objects of the image 500 may correspond to the features of the map information 300. For example, image 500 includes various objects such as lane lines 510, 514, 516, and 518, stop sign 520, and crosswalk 530 which may correspond to the features of lane lines 310, 314, 316 and 318, of the map information 300.

Figure 6:
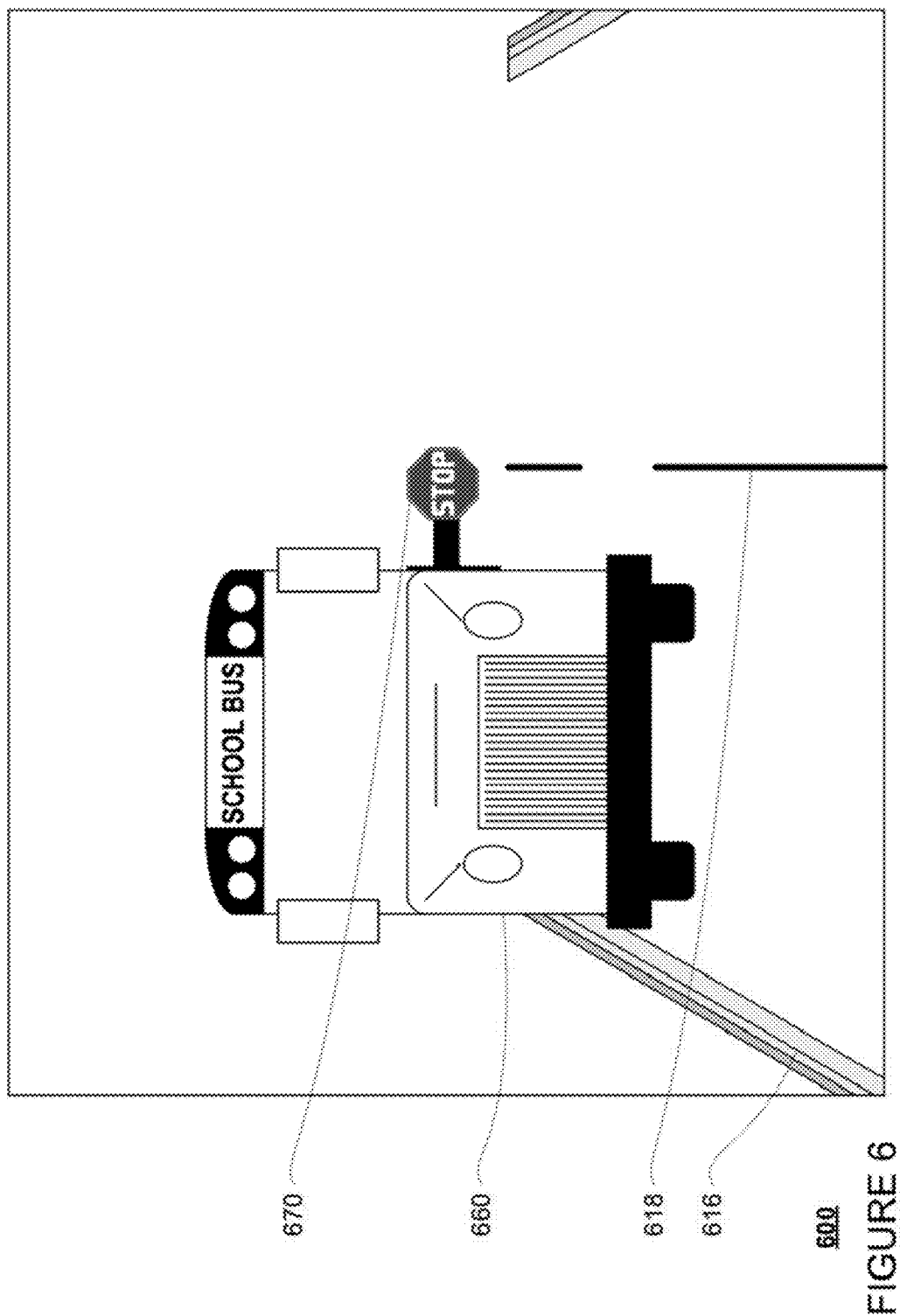
FIG. 6 is another example image of the vehicle's environment in accordance with aspects of the disclosure.

FIG. 6 is an example of an image 600 of various objects in the vehicle's environment captured by camera 420 located at point C of FIG. 3 oriented in a generally east direction. Again, various objects of the image 600 may correspond to the features of the map information 300. For example, image 600 includes various objects such as lane lines 616 and 618 which may correspond to the features of lane lines 316 and 318, respectively of map information 300. In this example, the image also includes a school bus 660 including a temporary stop sign 670 that is currently in an active configuration (for example, extended to indicate to other drivers and vehicles that the school bus is currently stopped or in the process of stopping to load or unload children).

Figure 7:
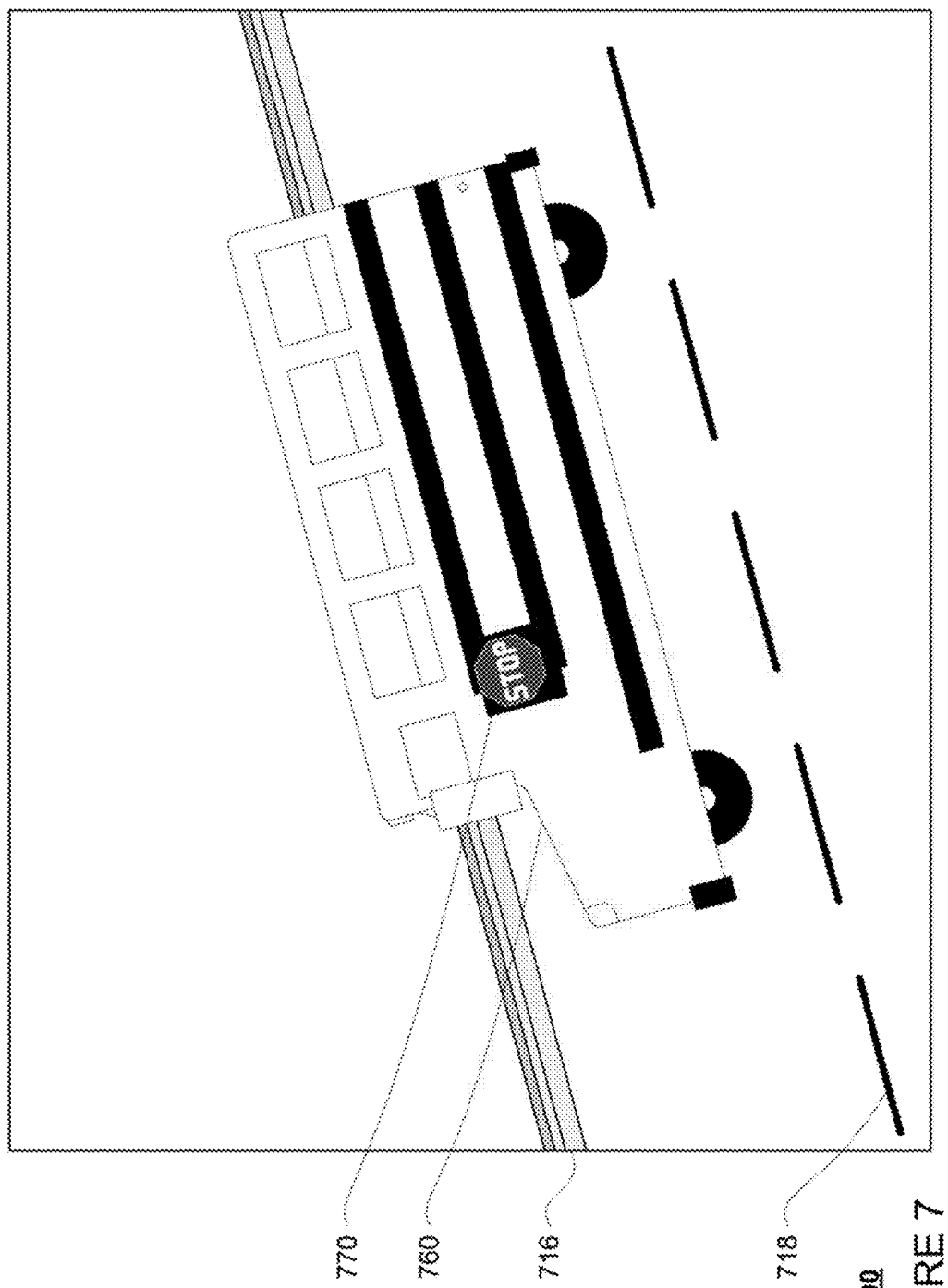
FIG. 7 is a further example image of the vehicle's environment in accordance with aspects of the disclosure.

As another example, FIG. 7 is an example of an image 700 of various objects in the vehicle's environment captured by camera 420 located at point D of FIG. 3 oriented in a generally north and east direction. Again, various objects of the image 700 may correspond to the features of the map information 300. For example, image 700 includes various objects such as lane lines 716 and 718 which may correspond to the features of lane lines 316 and 318, respectively of map information 300. In this example, the image also includes a school bus 760 including a temporary stop sign 770 that is currently in an inactive configuration (for example, retracted against the bus to indicate to other drivers and vehicles that the school bus is not to load or unload children).

Each of the images may be processed to identify the various objects discussed above. For example, objects, such as the stop signs 520, 670, and 770 of FIGS. 5, 6, and 7, may be detected from each of the images 500, 600, and 700 using various known image processing and feature recognition techniques. For instance, a variety of machine learning techniques may be used to detect objects such as stop signs, based on collected training data, by to extract features from an image and using these features determine whether a stop sign exists. As an example, templates of different dimensions corresponding to the shape of a stop sign (e.g., a hexagon) may be used to identify potential stop signs using a sliding window approach. False positives may be eliminated by further processing such as by comparing to the location in other camera images, using OCR to detect text of the stop sign, color and feature recognition, etc. Using this information, a machine learning classifier may process the detected features, colors, edges, etc. to estimate whether to treat a potential stop sign as a stop sign.

The approximate location of any identified objects of the images may be determined using various known techniques. For example, because the location of the camera when an image is captured is known from a location feature of the camera itself (e.g., GPS receiver, the location of the camera relative to the vehicle, etc.) and/or information from the vehicle's positioning system 170, approximate locations may be determined from multiple images with stereo vision or structure from motion techniques.

Once an object is identified, the autonomous vehicle may determine whether the object is a permanent one or a temporary one. For example, as noted above, the map information may include information about permanent objects, including their expected location. In other words, permanent objects, such as permanent stop signs, would be expected to be represented by a feature in the map information. Thus, by comparing the approximate location of an identified object to the map information, the vehicle's computing devices may determine whether the object is temporary or permanent.

Returning to the example of FIG. 5, the approximate location of stop sign 520 may correspond to the location of point E in FIG. 3. In this regard, the location of stop sign 520 generally corresponds, for example is within some acceptable threshold distance such as a few meters or more or less depending on the mapping accuracy and accuracy of the perception system, of the location of stop sign 320 of the map information. Because of this correspondence, the computing devices 110 may determine that stop sign 520 is a permanent stop sign.

In the example of FIG. 6, the approximate location of stop sign 670 may correspond to the location of point F in FIG. 3. In this regard, the location of stop sign 520 does not correspond, for example is not within the acceptable threshold distance, of the location of any stop sign of the map information. Because of this lack of correspondence, the computing devices 110 may determine that stop sign 670 is a temporary stop sign.

In the example of FIG. 7, the approximate location of stop sign 770 may correspond to the location of point G in FIG. 3. In this regard, the location of stop sign 520 does not correspond, for example is not within the acceptable threshold distance, of the location of any stop sign of the map information. Because of this lack of correspondence, the computing devices 110 may determine that stop sign 770 is also temporary stop sign.

For any objects determined to be temporary, the vehicle's computing devices may identify sensor data corresponding to the locations of detected objects within a region around the identified object. For example, the sensor data may include laser data points collected, for example, by one or more lasers such as lasers 410 and 412 and provided to the vehicle's computing devices by the perception system. The laser data points may identify the intensity and location of surfaces of the various objects in the vehicle's environment. Although the example above relates to laser data, other types of information may be used to detect a plane that extends away from or adjacent to a surface of the identified object. For example, using other camera images with stereo vision or structure from motion techniques, planar surfaces may also be detected and used to classify the state of an identified object.

In one example, the vehicle's computing devices may analyze the sensor data within a region corresponding to a particular volume of space around the location of the identified object. In one example, this volume may include a three dimensional box, sphere, etc. This volume may be larger than the shape of the stop sign and extend around the location of the stop sign in various directions. As an example, the volume may extend 1, 2, 3, or more cubic meters around the identified object.

The sensor data within the region may then be processed to first determine whether the points correspond to a plane proximate to the identified object. Various known techniques may be used to fit a plane from the sensor data and evaluate how good a fit it is (based on the variance of the points from the resulting plane). For example, a plane could be fit from all the points, or different subsets of the points using a "RANdom SAmple Consensus ("RANSAC") approach. Then all of the points can be used to evaluate how well the estimated plane matches the sensor data.

When no plane is detected within the region proximate to the surface of the stop sign, the vehicle's computing devices may classify the identified as an active or real object to which the vehicle should respond. Thus, if there is no such plane detected within a region around an identified stop sign, the computing devices 110 may classify the stop sign as an active stop sign.

When a plane is detected proximate to the surface of the identified object, the characteristics of the plane may be used to determine whether the object should be classified as active (real) or inactive. For example, active object may be proximate to a plane that is generally parallel to the surface of the stop sign but does not extend away from the surface of the object for at least the threshold distance. As noted above, an inactive object may be proximate to a plane that is generally parallel to the surface of the stop sign and extends away from the surface of the object for at least the threshold distance. Thus, vehicle's computing devices may expect a plane of an inactive object to extend away from one or more of the bottom, top, left, or right of the identified object at least some threshold distance. As an example, this threshold distance may be 1, 2, 3 or more meters. For example, the closer the plane is to the surface of an identified object and the greater the distance a plane extends away from or adjacent to a surface of the identified object (for example, at least 1 meter or more), the more likely, or higher confidence the vehicle's computing devices may have that the object is inactive.

Figure 8:
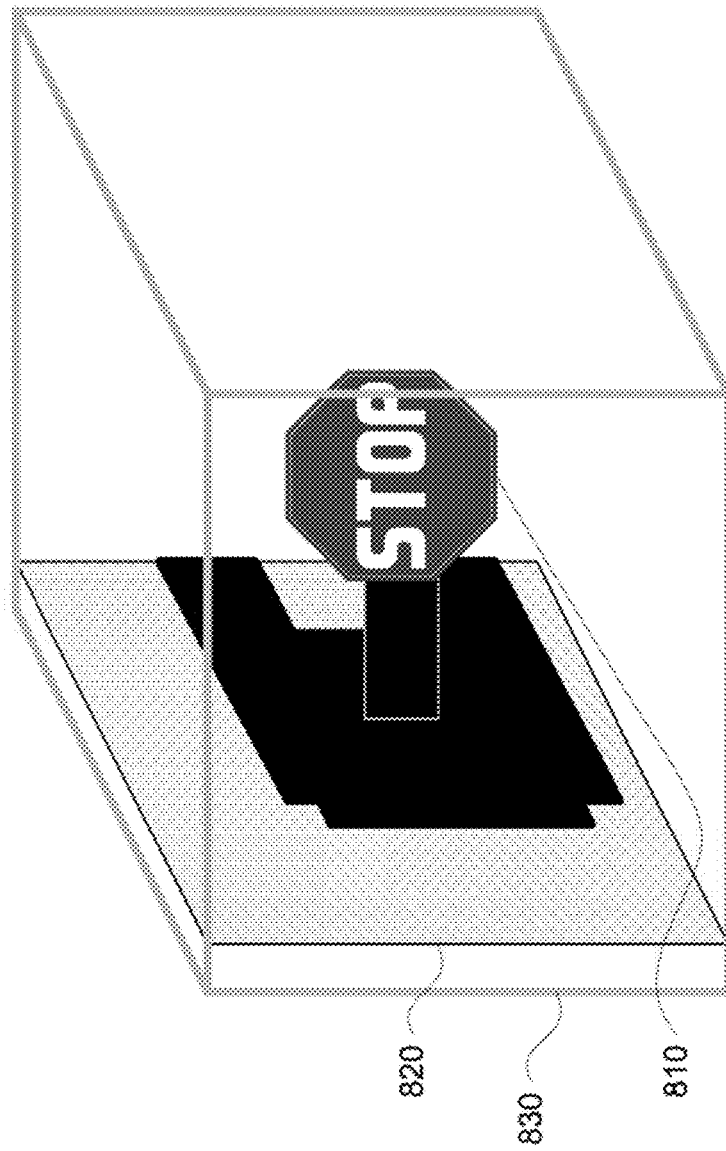
FIG. 8 is an example projection in accordance with aspects of the disclosure.

In another example, FIG. 8 is an example of a projection 800 of the laser data points corresponding to a region around the location stop sign 670 of FIG. 6. In this example, the laser data points include points 810 corresponding to the stop sign 670 as well as points 820 corresponding to the school bus 660 are projected into box 830. In this example, the plane of the school bus defined by points 820 is oriented generally perpendicular (or not generally parallel) to the surface of the stop sign defined by points 810. Here, the computing devices 110 may classify the stop sign 670 as an active stop sign because the plane of points 820 extends away from the plane of points 810 at least the threshold distance.

Similarly, a temporary stop sign that was being held by a police officer or construction worker would not be proximate to a plane that is generally parallel to the surface of the stop sign and extends away from the surface of the stop sign for at least the threshold distance. Thus, such stop signs may be classified by the vehicle's computing devices as active stop signs.

Figure 9:
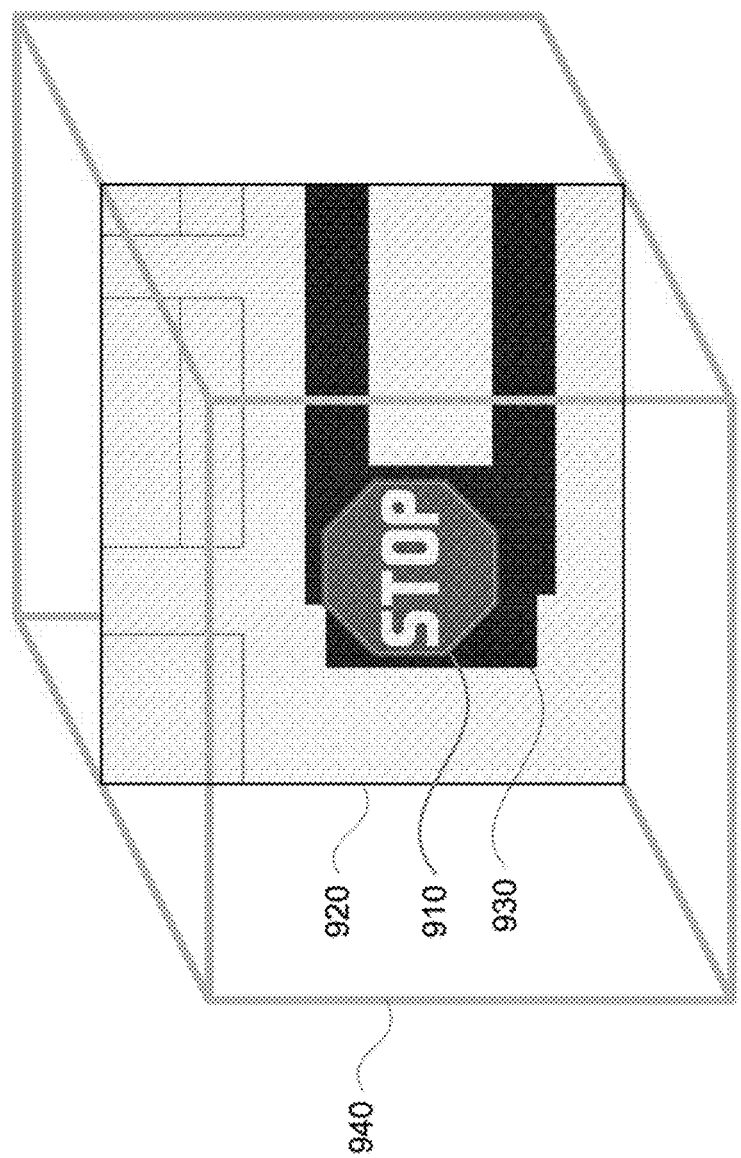
FIG. 9 is another example projection in accordance with aspects of the disclosure.

In another example, FIG. 9 is an example of a projection 900 of the laser data points corresponding to area region around the location stop sign 770 of FIG. 7. In this example, the laser data points include points 910 corresponding to the stop sign 770, points 920 corresponding to the school bus 760, and points 930 corresponding to a structure for extending stop sign 770 to the active position are projected into box 940. In this example, the plane of the school bus defined by points 920 is oriented generally parallel to the surface of the stop sign defined by points 910. However, the plane of the structure for extending stop sign 770 to the active position defined by points 930 is oriented generally perpendicular to the surface of the stop sign defined by points 910. Yet, in this example, the plane of the structure for extending stop sign 770 to the active position defined by points 930 would not extend the threshold distance as described above. Thus, the vehicle's computing devices 110 may classify the stop sign 770 as an inactive stop sign.

Similarly, a temporary stop sign that was attached to a fence be not be proximate to a plane that is generally parallel to the surface of the stop sign and extends away from the surface of the stop sign for at least the threshold distance. Thus, such stop signs may be classified by the vehicle's computing devices as an inactive stop signs.

In some cases, an inactive object may actually be a false positive. As an example, a false positive may include a stop sign that is a reflection of a permanent or active stop sign on a highly specular surface. Again, such stop signs would not be proximate to a plane that is generally parallel to the surface of the stop sign and extends away from the surface of the stop sign for at least the threshold distance. Thus, such stop signs would be determined by the vehicle's computing devices to be inactive stop signs.

The active or inactive status of an identified object may be used by the vehicle's computing devices to determine whether or not to respond to the object. For example, the computing devices 110 may determine that stop sign 670 is an active stop sign and stop for the school bus 660 until the stop sign 670 is retracted to an inactive position. When a stop sign is determined to be inactive, such as stop sign 770, the computing devices may ignore the stop sign and simply proceed as usual. This would prevent dangerous situations such as stopping adjacent to a school bus when the school bus's stop sign is not active or not stopping for a stop sign held by a construction worker.

Although the examples above relate to stop signs, similar techniques may also be used to classify the status of other objects. For example, various types of temporary objects (such as parking cones, people, animals, or anything generally not included in the map information) may be detected in camera images. Using the laser or other data described above, if these objects are located on or adjacent to a plane of another object, it is highly likely that they do not exist (e.g., they are merely a reflection or picture of a real object) or that such objects are not otherwise important to the control of the autonomous vehicle. Thus, detecting whether a surface of an object, is on or adjacent to a planar surface of another object is a useful signal for classifying the status of many different types of objects.

Figure 10:
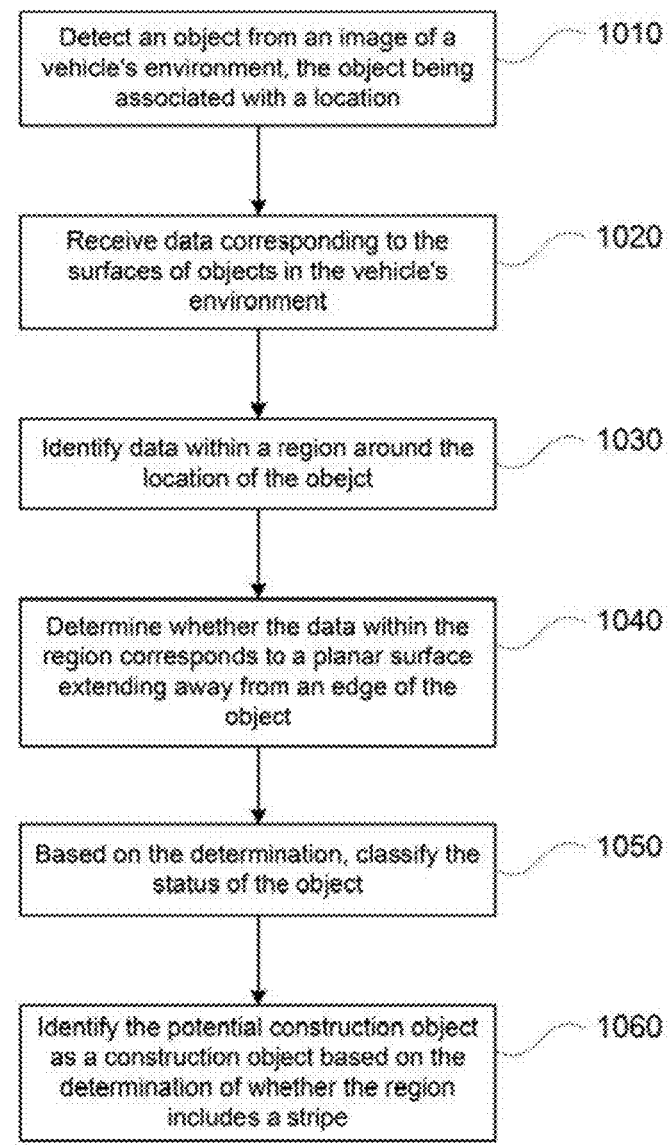
FIG. 10 is an example flow diagram in accordance with aspects of the disclosure.

FIG. 10 is an example flow diagram 1000 which depicts some of the aspects described above which may be performed by one or more computing devices such as one or more computing devices 110 of vehicle 100. In this example, an object is detected from an image of a vehicle's environment, the object being associated with a location at block 1010. Data corresponding to the surfaces of objects in the vehicle's environment is received at block 1020. Data within a region around the location of the object is identified at block 1030. Whether the data within the region around the location of the object to a planar surface extending away from an edge of the object is determined at block 1040. Based on the determination, the status of the object is classified at block 1050.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for determining whether a vehicle should respond to stop signs, the method comprising:
   detecting, by one or more computing devices, an object and a location of the object from an image of the vehicle's environment;
   determining, by the one or more computing devices, that the object is a stop sign;
   receiving, by the one or more computing devices, sensor data identifying locations and surfaces of objects within the vehicle's environment including the stop sign;
   determining, by the one or more computing devices, that the stop sign is a temporary stop sign by comparing the location to map information for the vehicle's environment;
   when the stop sign is determined to be temporary, processing, by the one or more computing devices, a portion of the sensor data with a predetermined volume of space around the location of the stop sign to determine whether a surface of the stop sign extends away from a second surface; and
   determining, by the one or more computing devices, whether the vehicle should respond to the stop sign based on the determination of whether the surface of the stop sign extends away from the second surface.

2. The method of claim 1, further comprising, when the surface of the stop sign extends away from a surface of another object, maneuvering the vehicle, by the one or more computing devices, to ignore the stop sign.

3. The method of claim 1, further comprising, when the surface of the stop sign does not away from a surface of another object, maneuvering the vehicle, by the one or more computing devices, to respond to and obey the stop sign.

4. The method of claim 1, wherein processing the portion of the sensor data includes determining that the object is a reflection of a stop sign, the method further comprises ignoring the stop sign.

5. The method of claim 1, wherein processing the portion of the sensor data includes determining that the stop sign is located on a flat surface, the method further comprises ignoring the stop sign.

6. The method of claim 1, wherein processing the portion of the sensor data includes determining that there is no second surface, and the method further comprising, maneuvering the vehicle, by the one or more computing devices, to respond to and obey the stop sign.

7. The method of claim 1, wherein processing the portion of the sensor data includes determining a distance between the stop sign and the second surface, and wherein determining whether the vehicle should respond to the stop sign is further based on the distance.

8. The method of claim 1, wherein processing the portion of the sensor data includes determining a distance that the second surface extends away from the surface of the stop sign, and wherein determining whether the vehicle should respond to the stop sign is further based on the distance.

9. A system for determining whether a vehicle should respond to stop signs, the system comprising one or more computing devices configured to:
    detecting an object and a location of the object from an image of the vehicle's environment;
    determining that the object is a stop sign;
    receiving sensor data identifying locations and surfaces of objects within the vehicle's environment including the stop sign;
    determining that the stop sign is a temporary stop sign by comparing the location to map information for the vehicle's environment;
    when the stop sign is determined to be temporary, processing a portion of the sensor data with a predetermined volume of space around the location of the stop sign to determine whether a surface of the stop sign extends away from a second surface; and
    determining whether the vehicle should respond to the stop sign based on the determination of whether the surface of the stop sign extends away from the second surface.

10. The system of claim 9, and the or more computing devices are further configured to, when the surface of the stop sign extends away from a surface of another object, maneuver the vehicle, by the one or more computing devices, to ignore the stop sign.

11. The system of claim 9, and the or more computing devices are further configured to, when the surface of the stop sign does not away from a surface of another object, maneuver the vehicle to respond to and obey the stop sign.

12. The system of claim 9, wherein processing the portion of the sensor data includes determining that the object is a reflection of a stop sign, the method further comprises ignoring the stop sign.

13. The system of claim 9, wherein processing the portion of the sensor data includes determining that the stop sign is located on a flat surface, and the or more computing devices are further configured to ignore the stop sign.

14. The system of claim 9, wherein processing the portion of the sensor data includes determining that there is no second surface, and the or more computing devices are further configured to maneuvering the vehicle to respond to and obey the stop sign.

15. The system of claim 9, wherein processing the portion of the sensor data includes determining a distance between the stop sign and the second surface, and wherein determining whether the vehicle should respond to the stop sign is further based on the distance.

16. The system of claim 9, wherein processing the portion of the sensor data includes determining a distance that the second surface extends away from the surface of the stop sign, and wherein determining whether the vehicle should respond to the stop sign is further based on the distance.

17. The system of claim 9, further comprising one or more sensors configured to generate the sensor data.

18. The system of claim 9, further comprising the vehicle.

19. A non-transitory recording medium on which instructions are stored, the instructions, when executed by one or more computing devices, cause the computing device to perform method for determining whether a vehicle should respond to stop signs, the method comprising:
    detecting an object and a location of the object from an image of the vehicle's environment;
    determine that the object is a stop sign;
    receive sensor data identifying locations and surfaces of objects within the vehicle's environment including the stop sign;
    determine that the stop sign is a temporary stop sign by comparing the location to map information for the vehicle's environment;
    when the stop sign is determined to be temporary, process a portion of the sensor data with a predetermined volume of space around the location of the stop sign to determine whether a surface of the stop sign extends away from a second surface; and
    determine whether the vehicle should respond to the stop sign based on the determination of whether the surface of the stop sign extends away from the second surface.

20. The medium of claim 19, wherein the method further comprises, when the surface of the stop sign extends away from a surface of another object, maneuvering the vehicle to ignore the stop sign.

* * * * *